(12) United States Patent
Nakamura et al.

(10) Patent No.: US 10,642,006 B2
(45) Date of Patent: May 5, 2020

(54) FISHEYE LENS

(71) Applicant: Shanghai Xiaoyi Technology Co., Ltd., Shanghai (CN)

(72) Inventors: Akira Nakamura, Tokyo (JP); Wanghu Wu, Shanghai (CN); Pingyu Tang, Shanghai (CN); Peng Ji, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 63 days.

(21) Appl. No.: 16/035,845

(22) Filed: Jul. 16, 2018

(65) Prior Publication Data

US 2019/0107693 A1 Apr. 11, 2019

(30) Foreign Application Priority Data

Oct. 10, 2017 (CN) .......................... 2017 1 0934254

(51) Int. Cl.
*G02B 13/06* (2006.01)
*G02B 27/00* (2006.01)
*G02B 9/62* (2006.01)

(52) U.S. Cl.
CPC .............. *G02B 13/06* (2013.01); *G02B 9/62* (2013.01); *G02B 27/0037* (2013.01)

(58) Field of Classification Search
CPC .. G02B 13/0005; G02B 13/00; G02B 26/125; G02B 27/0031; G02B 13/22; G02B 9/12; G02B 13/04; G02B 9/64; G02B 13/06; G02B 1/00; G02B 9/62; G02B 27/0037
See application file for complete search history.

(56) References Cited

U.S. PATENT DOCUMENTS

| | | | |
|---|---|---|---|
| 3,576,360 | A | 4/1971 | Shimizu |
| 2007/0139793 | A1 | 6/2007 | Kawada |
| 2012/0206822 | A1 | 8/2012 | Hsiehs et al. |
| 2014/0211009 | A1 | 7/2014 | Fürsich |
| 2017/0242220 | A1* | 8/2017 | Lee .......................... G02B 13/06 |
| 2017/0307857 | A1* | 10/2017 | Ning ....................... G02B 13/06 |

FOREIGN PATENT DOCUMENTS

JP       2014102291 A       6/2014

OTHER PUBLICATIONS

Extended European Search Report issued by the European Patent Office dated Feb. 22, 2019, for the counterpart European patent application 18199394.0.
European First Office Action corresponding to Application No. 18199394.0-1020; dated Dec. 6, 2019.

* cited by examiner

*Primary Examiner* — Alicia M Harrington
(74) *Attorney, Agent, or Firm* — Cantor Colburn LLP

(57) ABSTRACT

Embodiments of the disclosure provide a fisheye lens. The fisheye lens can include a first lens group near an object side, a second lens group near an imaging plane, and an aperture diaphragm disposed between the first and second lens groups. The first lens group can include, disposed sequentially from the object side to the imaging plane, a negative meniscus spherical first lens, an aspherical second lens, and an aspherical third lens. The second lens group can include, disposed sequentially from the object side to the imaging plane, a positive meniscus spherical fourth lens, a fifth lens formed of a positive biconvex spherical lens and a negative biconcave spherical lens, and an aspherical sixth lens.

8 Claims, 1 Drawing Sheet

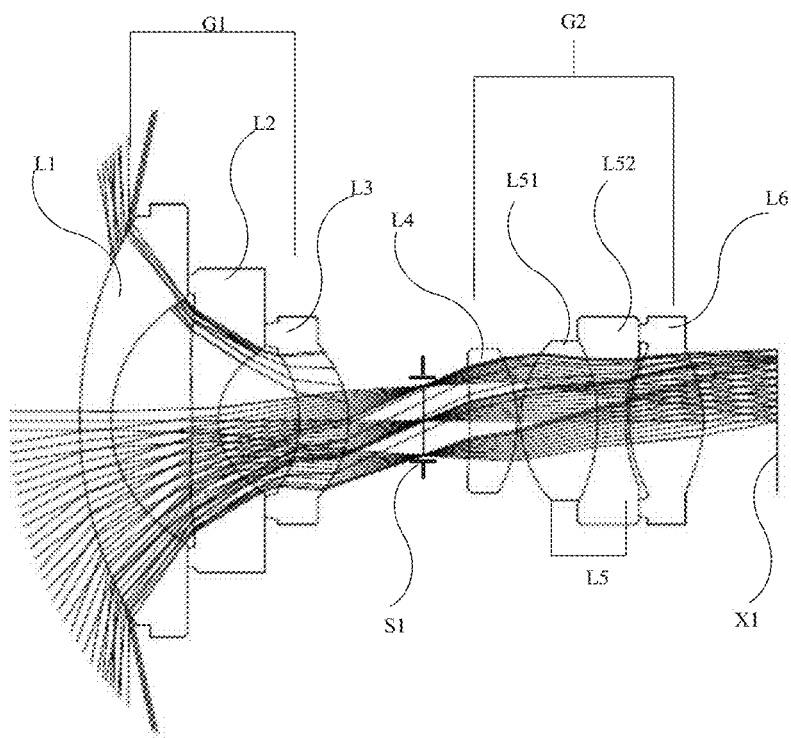

FISHEYE LENS

CROSS REFERENCE TO RELATED APPLICATION

The disclosure claims the benefits of priority to Chinese Application No. 201710934254.4, filed on Oct. 10, 2017, which is incorporated herein by reference in its entirety.

TECHNICAL FIELD

This disclosure relates to the field of optical lens technology, and more particularly to a fisheye lens.

BACKGROUND

Smart Internet hardware continues to develop and expand. Particularly, as panoramic photography, panoramic dash cam, and virtual reality technologies continue to develop, the demand for ultra-wide-angle optical lenses with high-quality, low-cost, and wide apertures is growing. Further, as the market demand continues to heat up, smart hardware companies emerge and competition among them intensifies. Increasing production throughput yield, lowering costs, and increasing value-to-cost ratios are all important means by which to maintain competitive advantage.

However, with conventional technology, the imaging quality of fisheye lenses is poor. For example, the resulting images of the conventional fisheye lenses have low clarity, and such images do not attain uniform quality along the peripheries of these images.

SUMMARY

To resolve the technical problem discussed above, embodiments of this disclosure provide a fisheye lens. The fisheye lens can include a first lens group near an object side, a second lens group near an imaging plane, and an aperture diaphragm disposed between the first and second lens groups. The first lens group includes, disposed sequentially from the object side to the imaging plane, a negative meniscus spherical first lens, an aspherical second lens, and an aspherical third lens. A concave surface of the first lens faces the imaging plane, and the convex surface of the first lens faces the object side, a surface of greater curvature of the second lens faces the object side, and a surface of lesser curvature of the second lens faces the imaging plane. The concave surface of the third lens faces the object side, and a convex surface of the third lens faces the imaging plane. The second lens group includes, disposed sequentially from the object side to the imaging plane, a positive meniscus spherical fourth lens, a fifth lens formed of a positive biconvex spherical lens and a negative biconcave spherical lens, and an aspherical sixth lens. A concave surface of the fourth lens faces the object side, and a convex surface of the fourth lens faces the imaging plane. A concave surface of the fifth lens faces the imaging plane, and a convex surface of the fifth lens faces the object side. A convex surface of the sixth lens include a protruding installation ring facing the object side, and a convex surface of the sixth lens include a flat installation platform facing the imaging plane.

With this configuration, the fisheye lens can, during image formation, effectively correct lens optical aberrations and reduce the sensitivity of the optical system. Additionally, the use of the aspherical second, third, and sixth lenses can increase the clarity of the resulting image and the uniformity of its periphery, thus better reconstructing the scene and enhancing the imaging quality of the lens.

Furthermore, the second lens, the third lens, and the sixth lens are plastic aspherical lenses. The use of multiple plastic aspherical lenses can greatly reduce fisheye lens production costs because molded plastic aspherical lenses can be produced with a higher throughput yield than glass aspherical lenses given the same processing precision requirement.

BRIEF DESCRIPTION OF THE DRAWINGS

FIG. 1 is a structural diagram illustrating an exemplary fisheye lens, according to embodiments of the disclosure.

DETAILED DESCRIPTION

To make the aforementioned purpose, characteristics, and advantages of the present invention more evident and easier to understand, detailed descriptions are provided below on specific example embodiments in reference to the drawing attached.

FIG. 1 is a structural diagram illustrating an exemplary fisheye lens, according to embodiments of the disclosure.

The fisheye lens illustrated in FIG. 1 may include a first lens group G1 near an object side, a second lens group G2 near the imaging plane X1, and an aperture diaphragm S1 disposed between the first and second lens groups.

The first lens group G1 can include, disposed sequentially from the object side (not shown in the drawing) to the imaging plane X1, a negative meniscus spherical first lens L1, an aspherical second lens L2, and an aspherical third lens L3. A concave surface of the first lens L1 can face the imaging plane X1, and a convex surface of the first lens L1 can face the object side. The surface with greater curvature of the second lens L2 faces the object side, and the surface with lesser curvature of the second lens L2 faces the imaging plane X1. The concave surface of the third lens L3 faces the object side, and the convex surface of the third lens L3 faces the imaging plane X1.

The second lens group G2 can include, disposed sequentially from the object side to the imaging plane, a positive meniscus spherical fourth lens L4, a fifth lens L5 formed of a positive biconvex spherical lens L51 and a negative biconcave spherical lens L52, and an aspherical sixth lens L6. The concave surface of the fourth lens L4 can face the object side, and the convex surface of the fourth lens L4 can face the imaging plane X1. The concave surface of the fifth lens L5 can face the imaging plane X1, and the convex surface of the fifth lens L5 can face the object side. The convex surface of the sixth lens L6 with a protruding installation ring can face the object side, and the convex surface of the sixth lens L6 with a flat installation platform can face the imaging plane X1. For example, with reference to FIG. 1, a protruding installation ring of the sixth lens L6 is attached to negative biconcave spherical lens L52.

The fisheye lens according to embodiments of the present disclosure may be used on 4K-resolution video camera platforms. By a combination of the first lens L1 through the sixth lens L6, the fisheye lens can, during image formation, effectively correct lens optical aberrations and reduce the sensitivity of the optical system, thus achieving a higher resolution and greater stability while better adapted for 4K sensors.

In some embodiments, the aperture diaphragm S1 can be disposed between the first lens group G1 and the second lens group G2. The aperture diaphragm S1 can be spaced from the third lens L3 of the first lens group G1 and the fourth lens L4 of the second lens group G2 by predetermined distances. The numerical values of the distances may be configured according to actual application.

In some embodiments, the size of the aperture of the aperture diaphragm is either fixed or adjustable. For example, an aperture diaphragm with adjustable aperture size may have an aperture that is mechanically or electronically adjustable.

In some embodiments of this disclosure, the fifth lens L5 can be formed by adhesion of the positive biconvex spherical lens L51 with the negative biconcave spherical lens L52.

In some embodiments, the fifth lens L5 is a compound lens joined by adhesive. For example, the fifth lens L5 can be formed by adhesion of the positive biconvex spherical lens L51 with the negative biconcave spherical lens L52. The fifth lens L5 can reduce chromatic aberration and further enhance the imaging quality of the fisheye lens.

In some embodiments of this disclosure, the fifth lens L5 is formed by close placement of the positive biconvex spherical lens L51 with the negative biconcave spherical lens L52.

In some embodiments, the close placement of the positive biconvex spherical lens L51 and the negative biconcave spherical lens L52 can reduce the difficulty of production of the fisheye lens and raise throughput yield.

In some embodiments of this disclosure, the second lens L2, the third lens L3, and the sixth lens L6 are plastic aspherical lenses.

In some embodiments, the plastic material has the characteristics of high plasticity, high transmittance, and high temperature resistance. And, the precision of its manufacturing and throughput yield is improved. Therefore, plastic lens material, particularly as used for high-precision plastic aspherical lenses, not only can enhance the lenses' imaging quality, but can also enhance the manufacturing throughput yield and thereby decrease the production costs of the lens module.

Alternatively, the second lens L2, the third lens L3, and the sixth lens L6 may also be glass aspherical lenses.

In some embodiments, the first lens L1, the fourth lens L4, and the fifth lens L5 are glass spherical lenses. Because glass lenses accommodate a wide range of optical parameters and have high transmittance and high temperature resistance, the use of glass spherical lenses can enhance the imaging quality of the fisheye lens.

In some embodiments, the fisheye lens illustrated in FIG. 1 can further include a filter (not shown in FIG. 1), and the filter uses an IR film coating or dual filters to block infrared light.

The filter can filter and block ambient light. For example, an IR film can be coated on the filter to block the ambient light, or dual filters can be used to block the ambient light. When dual filters are being used, the fisheye lens can include dual filters accordingly. For example, one filter can be an infrared blocking filter or an absorption filter, and the other one can be a full spectrum filter.

In some embodiments of this disclosure, aspherical lenses of the second lens L2, the third lens L3, and the sixth lens L6 each satisfies the following formula:

$$Z = y^2 / \{1 + [1-(1+k)c^2y^2]^{1/2}\} + a_1 y^4 + a_2 y^6 + a_3 y^8 + a_4 y^{10} + a_5 y^{12} + a_6 y^{14}$$

Z represents the aspherical surface, c represents the curvature of the aspherical surface, y represents the radial coordinate, k represents the aspherical surface type coefficient, and $a_1$, $a_2$, $a_3$, $a_4$, $a_5$, and $a_6$ are the radial coefficients.

When the aspherical surface type coefficient is less than −1 (i.e., k<−1), the aspherical surface Z is hyperbolic. When the aspherical surface type coefficient equals −1 (i.e., k=−1), the aspherical surface Z is parabolic. When the aspherical surface type coefficient is less than 0 but greater than −1 (i.e., 0>k>−1), the aspherical surface Z is elliptic. When the aspherical surface type coefficient equals 0 (i.e., k=0), the aspherical surface Z is spherical. When the aspherical surface type coefficient is greater than 0 (i.e., k>0), the aspherical surface is oblate elliptic. The parameters above can precisely set the shape and size of the two aspherical surfaces of a lens.

Table 1 shows all of the coefficients corresponding to the aspherical lenses in one specific application scenario of this disclosure.

TABLE 1

| Coefficient | Second lens L2 | | Third lens L3 | | Sixth lens L6 | |
| --- | --- | --- | --- | --- | --- | --- |
|  | S3 | S4 | S5 | S6 | S13 | S14 |
| k | 0 | 0 | 0 | 0 | 0 | 0 |
| a1 | 7.01E−03 | −4.10E−04 | −7.91E−03 | 7.31E−04 | −5.76E−03 | 1.21E−02 |
| a2 | −5.90E−04 | 1.20E−03 | 1.81E−03 | 5.34E−04 | −1.12E−04 | −1.21E−03 |
| a3 | 2.62E−05 | −1.10E−04 | −4.33E−04 | −1.21E−04 | 1.91E−05 | 7.12E−05 |
| a4 | −4.55E−07 | −2.35E−05 | 4.61E−05 | 1.33E−05 | 7.80E−06 | 1.16E−05 |
| a5 | 0 | 0 | 0 | 0 | 0 | 0 |
| a6 | 0 | 0 | 0 | 0 | 0 | 0 |

Surface S3 is a surface of the second lens L2 that is close to the object side, and surface S4 is a surface of the second lens L2 that is close to imaging plane X1. Surface S5 is a surface of the third lens L3 that is close to the object side, and surface S6 is a surface of the third lens L3 that is close to imaging plane X1. Surface S13 is a surface of the sixth lens L6 that is close to the object side, and surface S14 is the surfaces of the sixth lens L6 that is close to imaging plane X1.

It is appreciated that the values of the coefficients shown in Table 1 are illustrative only and do not constitute limitations to embodiments of this disclosure. All of the aspherical surface coefficients can be configured and adjusted to adapt to actual application environments.

The lens surface parameters for the first lens L1, second lens L2, third lens L3, fourth lens L4, fifth lens L5, and sixth lens L6 are shown in Table 2.

TABLE 2

| Surface number | Type | Radius | Thickness | Refractive index (Nd) | Dispersion (Vd) | Semi-diameter |
|---|---|---|---|---|---|---|
| OBJ | Object plane | 400 | 400 | | | |
| S1 | Spherical surface | 13.502 | 1 | 1.9108 | 35.25 | 6.2 |
| S2 | Spherical surface | 4.486 | 2.34 | | | 3.8 |
| S3 | Aspherical surface | −17.983 | 0.8 | 1.54 | 56 | 3.5 |
| S4 | Aspherical surface | 2.6021 | 2.32 | | | 2.2 |
| S5 | Aspherical surface | −4.6401 | 1.424 | 1.661 | 20.34 | 2.02 |
| S6 | Aspherical surface | −3.4511 | 2.1422 | | | 2.13 |
| S7 | Aperture diaphragm | Infinity | 1.34 | | | 1.08 |
| S8 | Spherical surface | −25.196 | 1.3556 | 1.883 | 40.79 | 1.63 |
| S9 | Spherical surface | −4.821 | 0.1 | | | 1.89 |
| S10 | Spherical surface | 4.0921 | 2.2086 | 1.497 | 81.61 | 2.01 |
| S11 | Spherical surface | −6.2015 | 0.8 | 1.946 | 17.94 | 1.85 |
| S12 | Spherical surface | 5.552 | 0.1 | | | 1.83 |
| S13 | Aspherical surface | 4.1621 | 2.14 | 1.54 | 56 | 1.93 |
| S14 | Aspherical surface | −3.7716 | 0.5 | | | 2.14 |
| Image | Imaging plane | infinity | 0 | | | 2.19 |

As shown in Table 2, surface S1 is a surface of the first lens L1 that is close to the object side, and surface S2 is a surface of the lens L1 that is close to imaging plane X1. Surface S3 is a surface of the second lens L2 that is close to the object side, and surface S4 is a surface of the second lens L2 that is close to imaging plane X1. Surface S5 is a surface of the third lens L3 that is close to the object side, and surface S6 is a surface of the third lens L that is close to imaging plane X1. Surface S8 is a surface of the fourth lens L4 that is close to the object side, and surface S9 is a surface of the fourth lens L4 that is close to imaging plane X1.

As discussed above, the fifth lens L5 can be formed by adhesion of the positive biconvex spherical lens L51 with the negative biconcave spherical lens L52. Therefore, the fifth lens L5 can include three surfaces. The three surfaces can include a surface of spherical lens L51, a surface formed by the spherical lens L51 with the spherical lens L52, and a surface of the spherical lens L52. With reference to Table 2, the three surfaces can be surface S10, surface S11, and surface S12, respectively.

Surface S13 is the surface of the sixth lens L6 that is close to the object side, and surface S14 is the surface of the sixth lens L6 that is close to imaging plane X1.

The radius parameter can express the curvature of the lens, and the semi-diameter parameter can express the outer lens diameter.

It is appreciated that the values of all the parameters shown in Table 2 are illustrative only and do not constitute limitations to embodiments of this disclosure.

Notwithstanding the above disclosure of the present invention, it does not restrict the present invention. Any person of skill in the art may make various alterations and changes that are not detached from the spirit and scope of the present invention; therefore, the scope of protection for the present invention should be that as defined by the claims.

What is claimed is:

1. A fisheye lens, comprising a first lens group near an object side, a second lens group near an imaging plane, and an aperture diaphragm disposed between the first and second lens groups, wherein
the first lens group comprises, disposed sequentially from the object side to the imaging plane, a negative meniscus spherical first lens, an aspherical second lens, and an aspherical third lens;
a concave surface of the first lens faces the imaging plane, and a convex surface of the first lens faces the object side;
a surface with greater curvature of the second lens faces the object side, and a surface with less curvature of the second lens faces the imaging plane;
a concave surface of the third lens faces the object side, and a convex surface of the third lens faces the imaging plane;
the second lens group comprises, disposed sequentially from the object side to the imaging plane, a positive meniscus spherical fourth lens, a fifth lens formed of a positive biconvex spherical lens and a negative biconcave spherical lens, and an aspherical sixth lens;
a concave surface of the fourth lens faces the object side, and a convex surface of the fourth lens faces the imaging plane;
a concave surface of the fifth lens faces the imaging plane, and a convex surface of the fifth lens faces the object side; and
a convex surface of the sixth lens includes a protruding installation ring facing the object side, and a convex surface of the sixth lens includes a flat installation platform facing the imaging plane.

2. The fisheye lens according to claim 1, wherein the second lens, the third lens, and the sixth lens are glass aspherical lenses or plastic aspherical lenses.

3. The fisheye lens according to claim 2, wherein the aspherical lenses of the second lens, the third lens, and the sixth lens each satisfies the following formula:

$$Z=y^2/\{1+[1-(1+k)c^2y^2]^{1/2}\}+a_1y^4+a_2y^6+a_3y^8+a_4y^{10}+a_5y^{12}+a_6y^{14},$$

where Z represents an aspherical surface, c represents the curvature of the aspherical surface, y represents a radial coordinate, k represents an aspherical surface type coefficient, and $a_1$, $a_2$, $a_3$, $a_4$, $a_5$, and $a_6$ are radial coefficients.

4. The fisheye lens according to claim 1, wherein the first lens, the fourth lens, and the fifth lens are glass spherical lenses.

5. The fisheye lens according to claim 1, wherein the fifth lens is formed by adhesion of the positive biconvex spherical lens with the negative biconcave spherical lens.

6. The fisheye lens according to claim 1, wherein the fifth lens is formed by close placement of the positive biconvex spherical lens with the negative biconcave spherical lens.

7. The fisheye lens according to claim 1, wherein a size of the aperture of the aperture diaphragm is either fixed or adjustable.

8. The fisheye lens according to claim 1, further comprising a filter, wherein the filter uses an IR film coating or dual filters to block infrared light.

* * * * *